Figure 6:
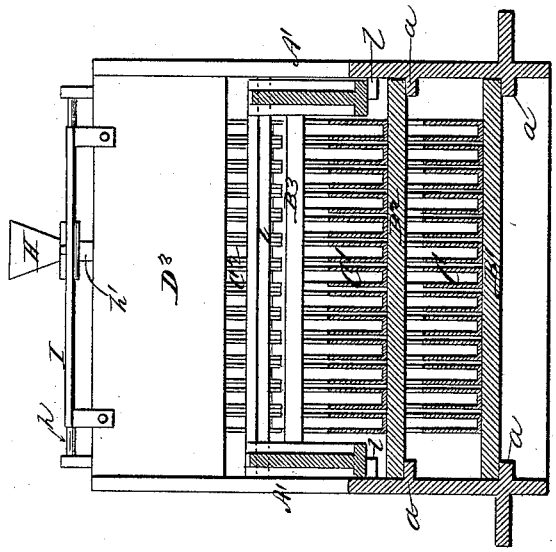

(No Model.) 6 Sheets—Sheet 1.
A. A. LOW.
TYPE DISTRIBUTING APPARATUS.
No. 409,690. Patented Aug. 27, 1889.
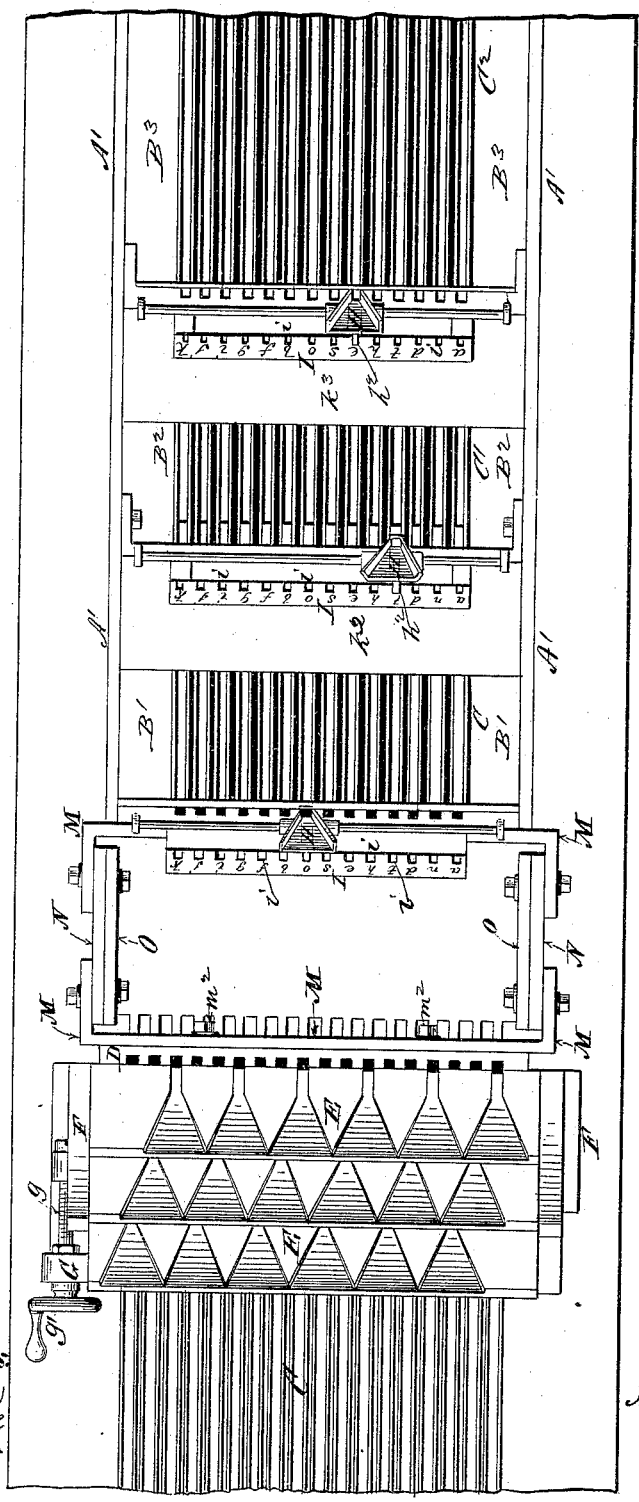

(No Model.) 6 Sheets—Sheet 2.
A. A. LOW.
TYPE DISTRIBUTING APPARATUS.
No. 409,690. Patented Aug. 27, 1889.
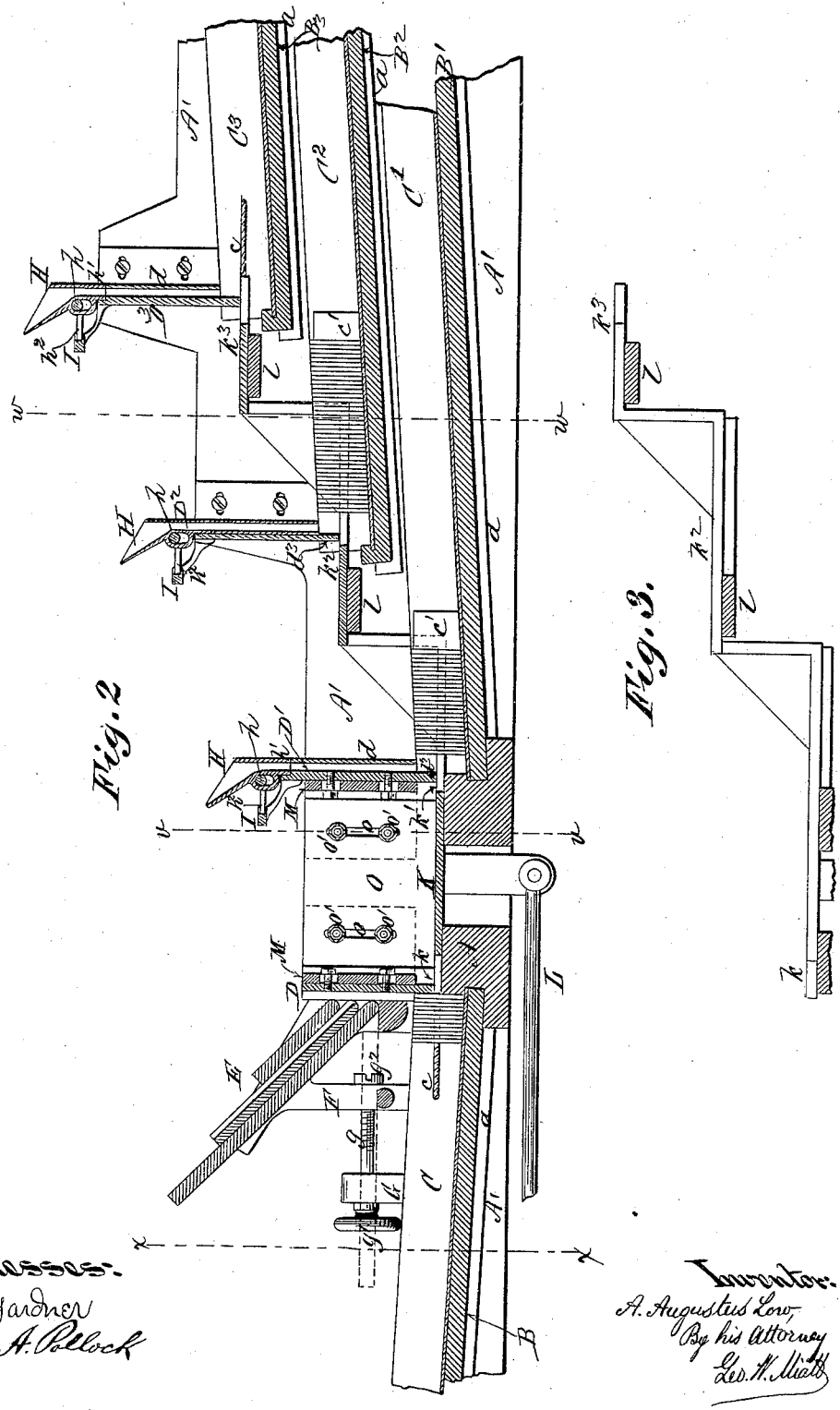

(No Model.) 6 Sheets—Sheet 3.

A. A. LOW.
TYPE DISTRIBUTING APPARATUS.

No. 409,690. Patented Aug. 27, 1889.

Witnesses:
Wm Gardner
Wm A. Pollock

Inventor:
A. Augustus Low
By his Attorney
Geo. W. Miatt (No Model.) 6 Sheets—Sheet 4.
A. A. LOW.
TYPE DISTRIBUTING APPARATUS.
No. 409,690. Patented Aug. 27, 1889.
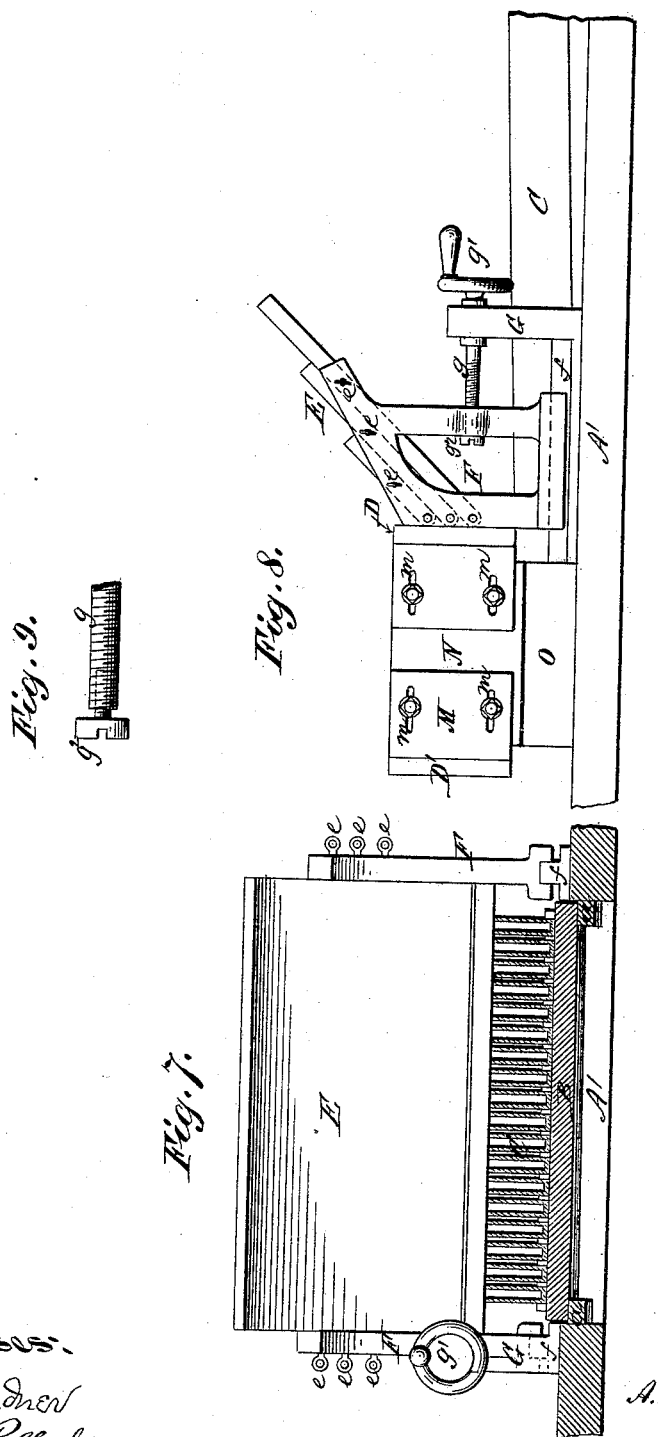
Witnesses:
Wm Gardner
Wm A. Pollock
Inventor
A. Augustus Low
By his Attorney
Geo. H. Miatt (No Model.) 6 Sheets—Sheet 5.
A. A. LOW.
TYPE DISTRIBUTING APPARATUS.
No. 409,690. Patented Aug. 27, 1889.
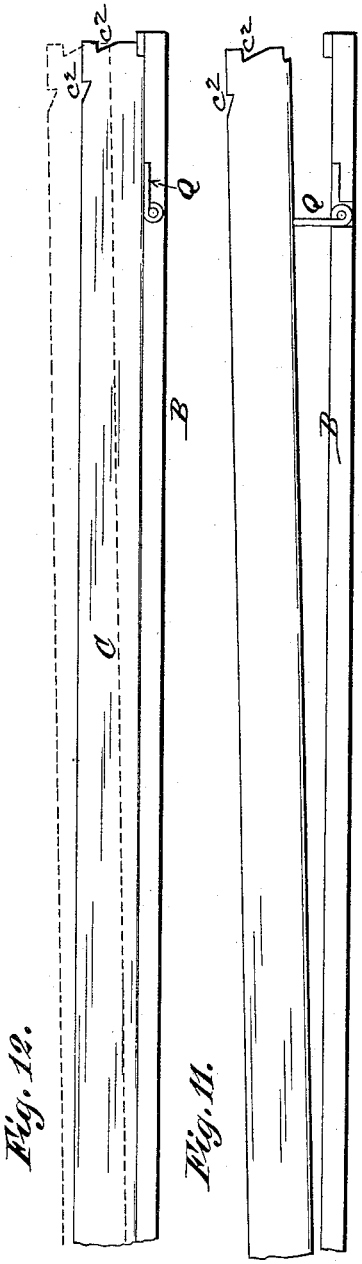
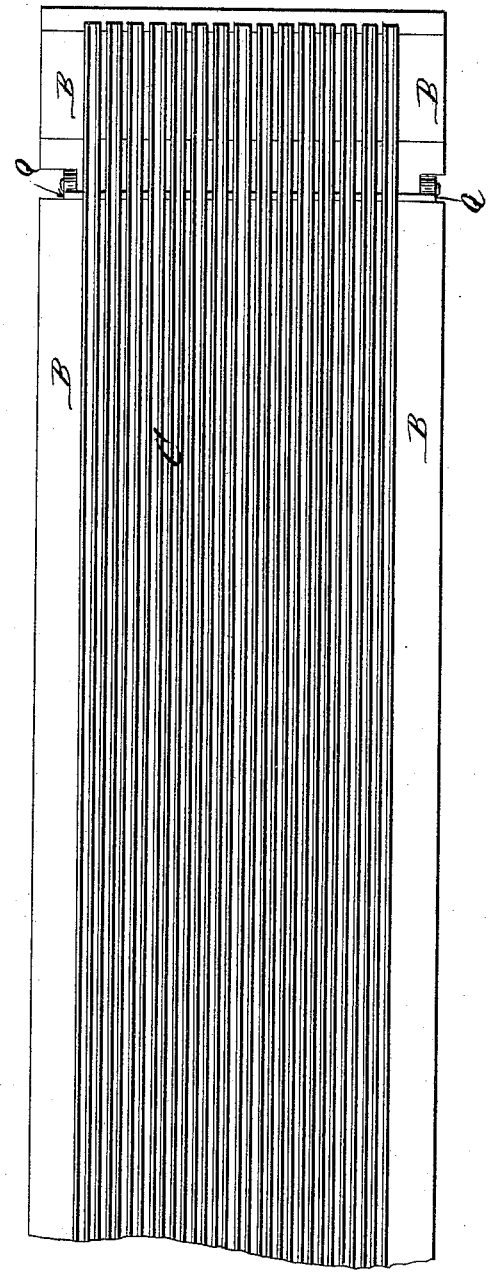
Witnesses:
Wm. Gardner
Wm. A. Pollock
Inventor:
A. Augustus Low
By his Attorney
Geo. W. Miatt (No Model.) 6 Sheets—Sheet 6.
A. A. LOW.
TYPE DISTRIBUTING APPARATUS.
No. 409,690. Patented Aug. 27, 1889.
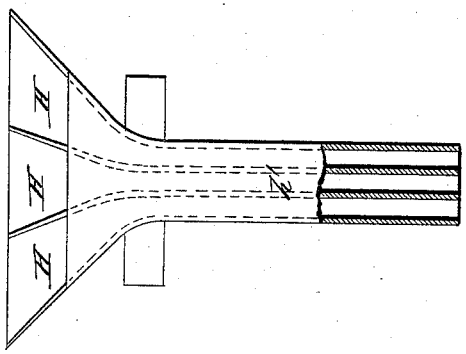
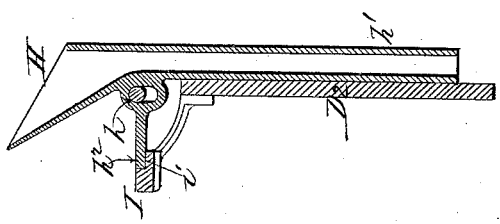
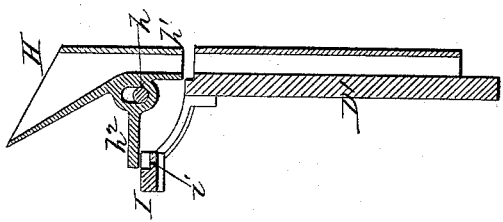
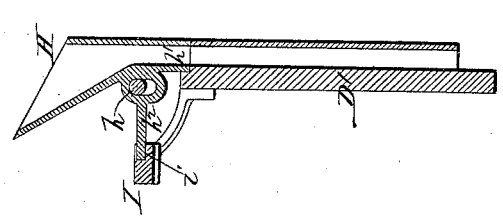
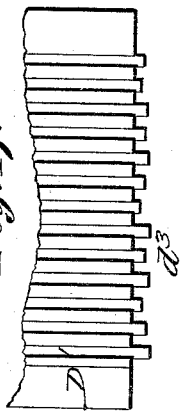

UNITED STATES PATENT OFFICE.

ABBOTT AUGUSTUS LOW, OF BROOKLYN, ASSIGNOR TO THE ALDEN TYPE MACHINE COMPANY, OF NEW YORK, N. Y.

TYPE-DISTRIBUTING APPARATUS.

SPECIFICATION forming part of Letters Patent No. 409,690, dated August 27, 1889.

Application filed November 12, 1886. Serial No. 218,684. (No model.)

*To all whom it may concern:*

Be it known that I, ABBOTT AUGUSTUS LOW, a citizen of the United States, residing in the city of Brooklyn, in the county of Kings and State of New York, have invented certain new and useful Improvements in Type-Distributing Apparatus, of which the following is a specification sufficient to enable others skilled in the art to make and use the same.

My improvements relate to the class of type-distributing apparatus in which the types are distributed by hand into type receiving and conducting channels, from which they are transferred by reciprocating type-forwarding mechanism into removable type-containing channels temporarily inserted in the apparatus for their reception.

The general arrangement and operation of this class of distributing apparatus is set forth in the patents heretofore granted to Louis K. Johnson and myself.

An important feature of my invention consists in adapting the apparatus to the simultaneous distribution of two or more styles or fonts of type, so that it shall be especially adapted for use in connection with mixed matter—as, for instance, book matter containing a large amount of italic or other exceptional style of type. I accomplish this by the use of a terraced pusher, which is adapted to forward the types in all of the channels of corresponding series or banks of superposed channels, each series or bank being provided with its own type-receiving mechanism, into which the types are deposited by hand. I thus obviate the necessity of the compositor leaving his position in front of the case while distributing mixed matter, as he would otherwise have to do in order to properly dispose of the special lines or words of type as they occurred, and I thereby economize both time and labor in the distribution of such matter. Since each bank or series of type-receiving channels is entirely distinct and independent in situation and operation from the others, and is therefore always ready for use alone when required, it is obvious that I also largely extend the usefulness and scope of the apparatus. Each series of type-containing channels is supported and arranged within the apparatus in such manner that it can be inserted or removed from position without interfering with the use of the other series and their several type-receiving plates are situated at sufficient distances apart to allow access from above to the receiving ends of all the channels.

This arrangement of the separate series of terraced type-containing channels, &c., may be used either alone or in combination with the duplex form of type-distributer heretofore used, in which a centrally located double reciprocating pusher forwards the types in series of type-containing channels situated upon either side. When used in connection with the latter form of apparatus, which is the combination herein shown and described, the terraced pusher, superposed series of channels, &c., are preferably arranged upon the left-hand side of the apparatus, while the right-hand side is provided with a series of superposed type-receiving plates, conduits, &c., for the reception of the common types, which are substantially the same in construction and operation as those heretofore used, except as to certain special features, to be more fully described hereinafter. For instance, in order to give ready access to all or any of the type-receiving plates at any time they are pivotally suspended at their lower edges, so that they may be individually swung backward and downward and as quickly swung up into place again without altering their relation to the vertical type-conduits.

I am aware that in previous applications the series of type-receiving plates are shown as hinged together at alternate ends, so that they may be opened out lengthwise, and I do not seek to cover herein the hinging of the receiving-plates, except when separately and independently pivotally suspended upon the frame at their lower edges in such manner that they may be individually swung downward or upward and back again without interference with those above or below, as the case may be.

Another feature in this connection consists in the use of a hand-screw for advancing and retracting the receiver-carriage, which is provided with an adjustable shoulder or stop for regulating with accuracy the extent of forward movement, and thereby avoiding all shock or jar against the conduit-plate when contact is made with it.

In my last application for patent for improvements in type-distributing apparatus I describe and claim the feature of making the vertical type-conduits which conduct the types into the type-containing channels below adjustable with relation to the mean position of the pusher for the purpose of regulating the effective stroke of the pusher-fingers within the said type-containing channels. In my present construction I not only accomplish this by other means than those previously described, but also provide for both the longitudinal and vertical adjustment of the said vertical type-conduits, to the end that all the parts may be brought into coincidence or "register" with accuracy.

Since it is desirable that the apparatus shall be made with as few parts as possible, and since the use of what may be designated as the "auxiliary" series of type receivers, channels, &c., is comparatively slight, I have designed a movable type-receiver which is adapted for use in conjunction with a whole series of type-conduit channels. This is a comparatively wide-mouthed receiver adapted to slide upon a rod extending over the top of the vertical conduit-plate and converging into a type-passage which may be made to coincide with any of those in the conduit-plate below; or the said type-passage itself may be extended downward sufficiently to conduct the types directly into the type-containing channels.

An index is preferably arranged parallel with the receiver-rail, marked to coincide with the denominations of types to be deposited in the opposed channels, and the receiver is provided with a pointer or index-finger, by which means the requisite position of the receiver may be readily and accurately attained and secured. I design to form this movable receiver with two, three, or more distinct receiving-compartments and conducting-passages arranged side by side, so that two or more different letters may frequently be deposited without moving the device. For instance, by arranging the containing-channels with relation to each other in such manner that "a n d," "t h e," or other very frequent combinations of letters are to be accommodated in adjoining channels, I can, by the use of a plural receiver, dispose of the types conveniently and rapidly.

The receiver, whether single or plural in form, is designed to be moved back and forth along its horizontal rail by the left hand, otherwise unoccupied, while the right hand is free to grasp and deposit the successive types in the comparatively wide mouth of the receiver; or it can be moved by the right hand while in the act of depositing the type therein. Where the movable receiver is formed with a plurality of type-passages, the side walls of all the receiving-compartments converge fan-like toward the center, where the parallel side walls of the narrowed passages necessarily are in close proximity to each other. By this means I am enabled to attain comparatively wide entrances to the type-passages, into which the types may be safely and rapidly dropped. I also provide suitable means for simultaneously raising the outer ends of a whole series of type-containing channels when desired to facilitate their removal.

In the accompanying drawings I have illustrated practical means for giving effect to my improvements, although I do not wish to confine myself strictly to the precise form and construction shown, since it is obvious that in minor details the apparatus may be varied considerably without deviating materially from the spirit and intent of my invention.

Figure 5:
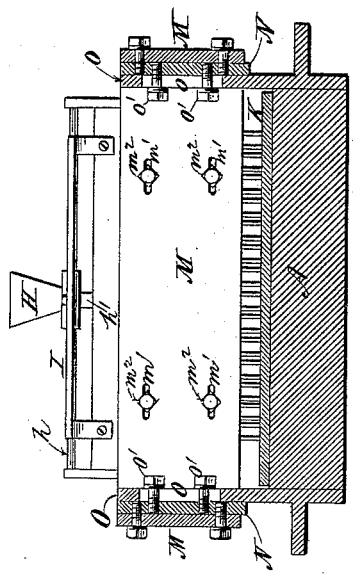
Figure 4:
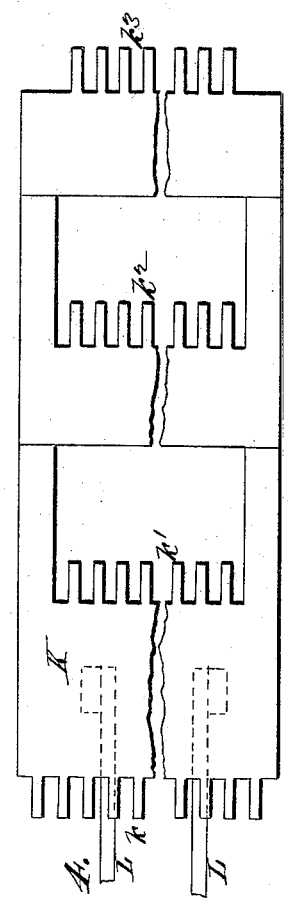

Figure 1 is a plan of the apparatus; Fig. 2, a vertical longitudinal section of the same; Fig. 3, an elevation of the terraced pusher, showing its transverse supports in section. Fig. 4 is a top view of the said pusher, the central portion thereof being broken away; Fig. 5, a transverse vertical section of the apparatus upon plane of line $v\,v$, Fig. 2. Fig. 6 is a transverse vertical section of the apparatus upon plane of line $w\,w$, Fig. 2. Fig. 7 is a vertical transverse section of the apparatus upon plane of line $x\,x$, Fig. 2. Fig. 8 is an elevation from the rear side of the apparatus, showing the mechanism for moving the receiver-plate carriage. Fig. 9 is a detail view showing the adjustable stop upon the end of the actuating-screw of the mechanism shown in Fig. 8. Fig. 10 is a top view of the outer extremities of a series of type-containing channels resting upon a bed or tray provided with means for raising their outer ends. Fig. 11 is an elevation of the arrangement shown in Fig. 10, illustrating the elevation of the outer ends of the series of channels. Fig. 12 is a similar view illustrating the elevation of the outer end of a channel individually. Fig. 13 is a vertical section through one of the transversely-movable receivers and adjoining parts, the receiver being represented as lowered into position for the deposition of a type into the conduit below. Fig. 14 is a similar view showing the receiver raised into position to be transferred to another conduit. Fig. 15 is a view similar to Fig. 13, except that in this case the lower end of the receiver is extended downward to form a tube which will conduct the types directly into the type-containing channels. Fig. 16 is a front elevation of a laterally-movable plural receiver. Fig. 17 is a front view of the lower portion of a conduit-plate, showing the variations in the length of the conduit-floors.

The type-containing channels C are supported in the frame A' of the apparatus upon inclined bed-plates B, although, if preferred, the inclination of the said channels C may be effected by other means. The bed-plates B are also preferably made removable for convenience in handling the channels, &c., being supported within the frame A' upon inclined ways $a\,a$. It will be noticed that the inclination imparted to the channels is the reverse of that heretofore employed, the inner or receiving ends of the channels in the present case being lower than their outer extremities.

The central portion of the apparatus is provided with the two conduit-plates D and D', arranged back to back, as heretofore, and also with one, two, or more plates $D^2\,D^3$, the latter being provided for the accommodation of the types to be distributed into the terraced series of type-containing channels $C'\,C^2$, arranged upon the right-hand side of the apparatus.

Provision is made for the reception of the types upon the left-hand side of the apparatus, as heretofore, by the use of a series of superposed type-receiving plates E, which transfer the types to the vertical conduits D, by which they are deposited in the series C of type-containing channels below. These superposed receiving-plates E are mounted upon a movable carriage or frame F, which rests upon parallel rails or ways $f$, extending in a longitudinal direction with relation to the apparatus. The carriage F is advanced or retracted upon the ways $f\,f$ by means of a screw $g$, mounted upon a stationary post or standard G and rotated by means of a crank $g'$ or other contrivance suitable for hand manipulation. The male thread of the screw $g$ engages with a corresponding female thread formed upon the frame F, so that by rotating the screw in the proper direction the carriage may be either advanced into position in front of the conduit-plate D for use or withdrawn therefrom for the purpose of gaining access to the lower end of the conduit-plate or receiving ends of the type-containing channels.

In order to prevent the carriage F and superposed plates E from being driven forcibly against the conduit-plate D, and for the purpose of gaging the proper relative position of the parts during distribution, I provide the end of the screw $g$ with an adjustable shoulder or stop $g^2$, which gages the forward movement of the carriage. This adjustable shoulder or stop $g^2$ may consist of the head of a screw which engages with a female screw tapped in the end of the actuating-screw $g$; or it might consist of a nut.

The plates E are pivotally connected to the carriage F at their lower forward ends and are held in position by pins $e\,e$, passing through the frame F and entering holes formed in their edges, or by any other suitable means. Thus by removing the pins $e$ or other fastenings for the upper ends of the plates they may be swung downward, either collectively or as indicated by dotted lines in Fig. 2, which represent the lowest plate as occupying a horizontal position. The lower ones may be independently swung downward to give access to the type-grooves.

Each of the conduit-plates D' and $D^3$ upon the left-hand side is provided with a cover or face-plate $d$, and it receives the types from a receiver H, which is movable along its upper edge. This receiver H slides, preferably, upon a rod $h$, or upon suitable ways, which permit of its lower end $h'$ being brought into coincidence with any of the type-conduits in the plates D' $D^3$ below. At the rear of the conduit-plate and parallel thereto is arranged an index I, formed with notches or recesses $i\,i$, which coincide in position with the conduits in the face of the plates D' $D^2$ $D^3$. A finger or pointer $h^2$ projects backward from the receiver H sufficiently to enter any of the said notches or receivers $i\,i$. The receiver H is mounted upon or attached to the rod $h$ in such manner that it may be raised sufficiently to disengage its pointer $h^2$ from the index in order to move it into a new position. When the latter having been attained with accuracy by aid of the index, it may again be dropped, the outer end of the pointer $h^2$ engaging with the appropriate notch and holding the receivers in the new position.

Instead of a comparatively short tube $h'$, arranged to coincide with the upper ends of the conduits in the plates D' $D^3$ when brought opposite, the receivers H may be made with their tubes $h'$ of sufficient length to reach down to the type-containing channels below, as illustrated in Fig. 15 and at $D^2$ in Fig. 2, in which case the conduits in the plates D' and $D^3$, as well as their covers $d$, may be dispensed with and simple plates or other suitable means for guiding and supporting the receiver and tube be substituted therefor.

Instead of being made single, the receivers H may be made in plural form, as illustrated in Fig. 16, so that one movement of the receivers will be sufficient in numerous cases to provide for the deposition of two or more types of different denominations.

The type-channel beds B' $B^2$ $B^3$ upon the left-hand side of the apparatus are arranged successively one above the other, the distance between their respective receiving-plates D' $D^2$ $D^3$ being sufficient only to permit of convenient access to the lower receiving ends of the type-channels from above when necessary. Any desired number of series of type-containing channels may thus be arranged in succession, according to the requirements for which the apparatus may be designed.

The reciprocating pusher or type-forwarder K, in addition to the double right and left combs $k\,k'$, is formed with additional series of combs $k^2\,k^3$ upon the left-hand side, which forward the types in the left-hand side series of channels $C^2$ and $C^3$.

The several combs may be connected together in any suitable manner so as to constitute practically a single piece, as shown in the drawings, or separate and independently reciprocating pushers may be provided for each series of channels, if preferred.

As shown in the drawings, the upper or terraced portions $k^2$ $k^3$ of the pusher are supported on cross-bars $l$ $l$, the lower section $k$ $k$ resting upon the frame A between the conduit-plates D D', and being actuated through a pitman L by means of a crank, eccentric, or other well-known mechanism, as heretofore.

The conduit-plates D D' are secured to vertical plates M M by means which permit of their adjustment horizontally thereon. The plates M M are also in turn secured to the plates N N by means which permit of their adjustment thereon horizontally. The plates N N are secured to the standards O O by means which permit of their adjustment vertically. It will thus be seen that I provide not only for the adjustment of the conduit-plates horizontally with relation to the position and stroke of the pusher, as heretofore, but also provide for both a lateral and vertical adjustment of the said plates. For instance, the slots $m$ $m$ in the ends of the plates M M permit of the old adjustment with relation to the pusher. The slots $m'$ $m'$ and screws $m^2$ $m^2$ provide for the adjustment of the conduit-plates D D' laterally across and with relation to the receiver-plates E or the series of type-containing channels below, while the slots $o$ $o$ and screws $o'$ $o'$ permit of the adjustment vertically of both the conduit-plates D D' and the intermediate supporting-plates M M.

The lower extensions of the conduit-back $d^3$ are graduated, as shown in Fig. 17, so as to project more or less into the type-containing channels, according to the thickness of the different types.

The type-containing channels C are provided at their receiving ends with type-sustainers $c$, consisting of my semi-elastic frictional shoulder or of any other suitable means for preventing the lower ends of the lines from falling back after the pusher. The types composing the extreme opposite ends of the lines are sustained in an upright position by comparatively small light slugs $c'$. The outer end of each channel is formed with a notch $c^2$ to afford a means of raising it up individually when in a series, as hereinbefore set forth, or for the purpose of withdrawing it longitudinally.

The outer ends of the bed-plates B' $B^2$ $B^3$, upon which the type-containing channels rest, are provided with transverse rockers or lifters Q Q, in such manner that the outer ends of a whole series of channels may be elevated bodily, when desired, above the usual channel-end-supporting shoulders, which retain the channels against longitudinal movement when in position upon the said bed-plates B' $B^2$ $B^3$.

What I claim as my invention, and desire to secure by Letters Patent, is—

1. In a type-distributing apparatus substantially such as described, the combination, with a series of type-containing channels, of a stationary type-channel support B, formed with an end-supporting shoulder for the said channels and with a channel-lifter Q, for elevating the outer ends of the type-containing channels above the said channel-end supports, for the purpose and substantially in the manner described.

2. In a type-distributing apparatus substantially such as described, the combination, with a series of superposed type-containing channels, of a reciprocating terraced type-forwarder, substantially in the manner and for the purpose described.

3. In a type-distributing apparatus substantially such as described, the combination, with a supporting frame or carriage, of a series of superposed type-receiving plates pivotally suspended at their lower edges, substantially in the manner and for the purpose described.

4. In a type-distributing apparatus substantially such as described, the combination, with a hand-screw for actuating the movable carriage upon which the type-receiving plates are mounted, of an adjustable shoulder or strip upon the end of the said actuating-screw, for the purpose and substantially in the manner described.

5. In a type-distributing apparatus substantially such as described, the combination, with the type-receiving plates mounted and arranged substantially as described, of a vertical conduit-plate which is adjustable longitudinally, substantially in the manner and for the purpose described.

6. In a type-distributing apparatus substantially such as described, the combination, with the type-receiving plates mounted and arranged substantially as described, of a vertical conduit-plate which is adjustable vertically, substantially in the manner and for the purpose described.

7. In a type-distributing apparatus substantially such as described, a movable type-receiver adapted to slide into coincidence with and to communicate with any of a series of type-channels, substantially in the manner and for the purpose described.

8. In a type-distributing apparatus substantially such as described, the combination, with a movable type-receiver and with a series of type-containing channels, substantially as set forth, of an index for registering the movable type-receiver with relation to the type-channels below, substantially in the manner and for the purpose described.

9. In a type-distributing apparatus substantially such as described, the combination, with a movable type-receiver and with a series of type-containing channels, substantially as set forth, of a series of recesses or notches arranged to receive and hold a pointer or projection upon the said movable receiver, for the purpose and substantially in the manner described.

10. In a type-distributing apparatus substantially such as described, the combination, with a series of type-containing channels, of a type-receiver which is movable laterally above the receiving ends of the said type-containing channels, for the purpose and substantially in the manner described, formed with plurality of receiving and conducting passages, substantially in the manner and for the purpose described.

A. AUGUSTUS LOW.

Witnesses:
 WM. GARDNER,
 GEO. W. MIATT.